US008615220B2

(12) United States Patent
Gaikwad et al.

(10) Patent No.: US 8,615,220 B2
(45) Date of Patent: Dec. 24, 2013

(54) METHODS AND SYSTEMS OF CALL MANAGEMENT

(75) Inventors: Umesh P. Gaikwad, Pune (IN); Bhushan P. Jain, Jalgaon (IN); Sandeep R. Patil, Elmsford, NY (US); Sri Ramanathan, Lutz, FL (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 13/102,613

(22) Filed: May 6, 2011

(65) Prior Publication Data

US 2012/0282890 A1 Nov. 8, 2012

(51) Int. Cl.
*H04M 3/42* (2006.01)
*H04M 1/00* (2006.01)
*H04W 24/02* (2009.01)
*H04W 36/00* (2009.01)

(52) U.S. Cl.
USPC .......... 455/414.1; 455/406; 455/456.1; 455/436; 455/552.1; 705/7.18; 705/7.19; 705/7.22; 705/7.24

(58) Field of Classification Search
USPC ........ 455/436–444, 552.1–553.1, 456.1–457, 455/414.1–414.4, 418–420, 445; 705/7.18–7.24

See application file for complete search history.

(56) References Cited

U.S. PATENT DOCUMENTS

| | | | |
|---|---|---|---|
| 5,303,297 A | 4/1994 | Hillis | |
| 5,425,084 A | 6/1995 | Brinskele | |
| 6,553,232 B1 | 4/2003 | Shaffer et al. | |
| 7,409,423 B2 * | 8/2008 | Horvitz et al. | 709/206 |
| 7,454,191 B2 | 11/2008 | Dawson et al. | |
| 7,565,141 B2 * | 7/2009 | Macaluso | 455/419 |
| 7,720,475 B2 * | 5/2010 | McKenna et al. | 455/435.1 |
| 7,774,453 B2 | 8/2010 | Babu et al. | |
| 7,937,082 B2 * | 5/2011 | Ohno et al. | 455/432.1 |
| 2002/0029108 A1 * | 3/2002 | Liu et al. | 701/208 |
| 2004/0122684 A1 | 6/2004 | Kaikuranta | |
| 2004/0198380 A1 | 10/2004 | Unmehopa | |
| 2004/0224682 A1 | 11/2004 | Kang | |
| 2006/0041657 A1 | 2/2006 | Wen et al. | |
| 2007/0259646 A1 | 11/2007 | Hu et al. | |
| 2007/0262860 A1 | 11/2007 | Salinas et al. | |
| 2008/0287141 A1 * | 11/2008 | Vogel et al. | 455/456.3 |
| 2009/0011777 A1 | 1/2009 | Grunebach et al. | |
| 2010/0029270 A1 | 2/2010 | Kiddie et al. | |
| 2010/0088248 A1 | 4/2010 | How et al. | |
| 2010/0130213 A1 | 5/2010 | Vendrow et al. | |

FOREIGN PATENT DOCUMENTS

JP    2002125066    4/2002

OTHER PUBLICATIONS

Bormann et al., "Towards Context-Aware Service Discovery: A Case Study for a new Advice of Charge Service", http://citeseerx.ist.psu.edu/viewdoc/download?doi=10.1.1.124.7267&rep=rep1&type=pdf, retrieved on Nov. 11, 2010, 5 pages.

(Continued)

*Primary Examiner* — Matthew Sams
(74) *Attorney, Agent, or Firm* — Matthew Chung; Roberts Mlotkowski Safran & Cole P.C.

(57) ABSTRACT

A method implemented in a computer infrastructure includes: determining a current location of a mobile communication device; determining a route of a user associated with the mobile communication device; and determining mobile call rates for the user at locations along the route.

25 Claims, 5 Drawing Sheets

(56) References Cited

OTHER PUBLICATIONS

"Mobile switching center (MSC)", http://www.electronics-manufacturers.com/products/wireless-communication/mobile-switching-center/, electronics manufacturers, retrieved May 4, 2011, 1 page.

"Short message service center", http://en.wikipedia.org/wiki/Short_Message_Service_Center, Wikipedia, retrieved May 4, 2011, 2 pages.

Brain et al., "How GPS Receivers Work", Sep. 25, 2006, http://electronics.howstuffworks.com/gadgets/travel/gps.htm, HowStuffWorks.com, retrieved May 4, 2011, 7 pages.

* cited by examiner

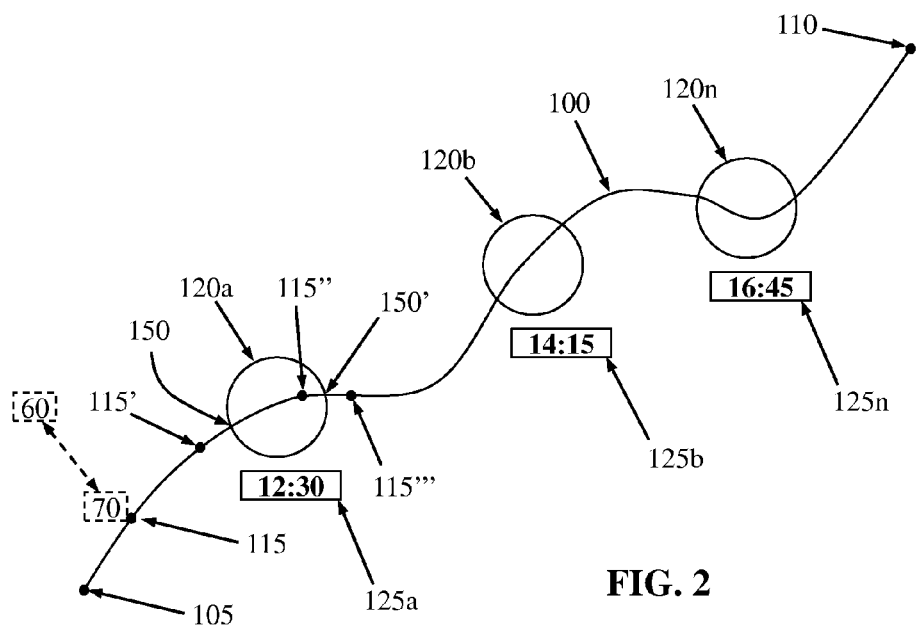
FIG. 2
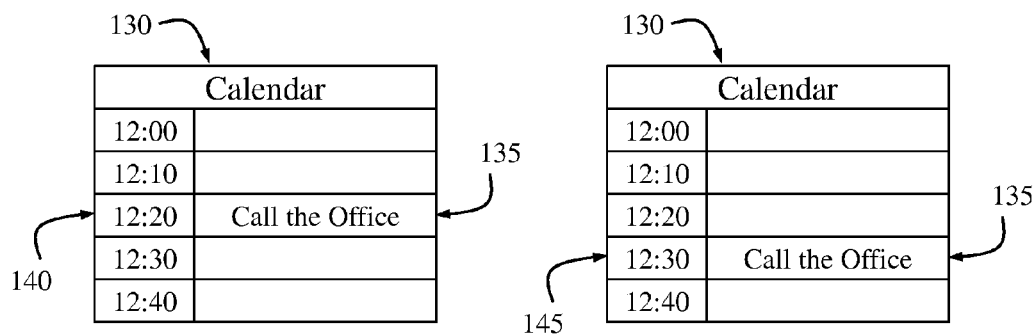
FIG. 3A                    FIG. 3B

METHODS AND SYSTEMS OF CALL MANAGEMENT

TECHNICAL FIELD

The present invention generally relates to mobile call management, and more particularly, to methods and systems for economic call management integrated with global positioning and a user calendar.

BACKGROUND

A mobile communication infrastructure divides the service area into a number of base station areas to provide mobile calling service. In order to increase the service capacity, each base station is again divided into a number of small service zones known as cells. The base stations are controlled by a mobile switching center (MSC) on a centralization basis so that a mobile station can maintain a call while roaming from one cell to another.

Each cell is typically defined by a radio frequency (RF) radiation pattern from a respective base transceiver station (BTS) antenna. A base station controller (BSC) may be coupled to an MSC and a packet data serving node (PDSN). In typical circuit-switched wireless communication systems, the MSC connects the landline public switched telephone network (PSTN) system to the wireless communication system.

The MSC is provided with information about any additional service and charging information of a mobile station in the visitor location register (VLR) and the home location register (HLR). For the service provider, the call charge is a significant factor considered in order to attract more subscribers. As the cost of the mobile calls is generally higher than wired calls, some service providers have begun providing competitive rates, especially in local area, in an attempt to attract more subscribers. As a result, a new billing policy is being used by the mobile service provider to charge their customers at a lower rate in a given service zone, so that mobile service providers can compete with the wired service provider. Thus, in the home zone, which is the main service area of the mobile user, a lower charge is applied to the mobile user; whereas a higher charge is applied in the non-home zones.

SUMMARY

In a first aspect of the invention, a method implemented in a computer infrastructure includes: determining a current location of a mobile communication device; determining a route of a user associated with the mobile communication device; and determining mobile call rates for the user at locations along the route.

In another aspect of the invention, there is a system implemented in hardware, the system including a processor executing a call manager that operates to: determine master data associated with a user and a mobile communication device; and determine mobile call rates for the user at locations along a route based on the master data.

In an additional aspect of the invention, there is a computer program product comprising a computer usable storage medium having readable program code embodied in the storage medium. The computer program product includes at least one component operable to: obtain master data associated with a user and a mobile communication device; determine mobile call rates for the user at locations along a route based on the master data; and transmit data to the mobile communication device notifying the user of at least one of the determined mobile call rates.

In a further aspect of the invention, there is a computer system for call management integrated with global positioning and a user calendar. The system comprises a CPU, a computer readable memory and a computer readable storage media. Additionally, the system comprises first program first program instructions to obtain master data associated with a user and a mobile communication device; second program instructions to determine mobile call rates for the user at locations along a route based on the master data; third program instructions to transmit data to the mobile communication device notifying the user of at least one of the determined mobile call rates; fourth program instructions to compare the determined mobile call rates to a calendar associated with the user; and fifth program instructions to change the calendar by rescheduling a call defined in the calendar to coincide with an estimated time the user will arrive at a location along the route having a lower call rate than other locations along the route. The first, second, third, fourth, and fifth program instructions are stored on the computer readable storage media for execution by the CPU via the computer readable memory. The master data comprises: user current location data, data defining the route, user subscription information, and at least one of coverage maps, rate maps and rate tables of available service providers along the route.

In another aspect of the invention, there is a method of deploying a system for call management integrated with global positioning and a user calendar. The method includes providing a computer infrastructure operable to: obtain master data associated with a user and a mobile communication device; determine mobile call rates for the user at locations along a route based on the master data; transmit data to the mobile communication device notifying the user of at least one of the determined mobile call rates; compare the determined mobile call rates to a calendar associated with the user; and change the calendar by rescheduling a call defined in the calendar to coincide with an estimated time the user will arrive at a location along the route having a lower call rate than other locations along the route. The master data comprises: user current location data, data defining the route, user subscription information, and at least one of coverage maps, rate maps and rate tables of available service providers along the route.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIG. 2 shows a diagrammatic representation of a display in accordance with aspects of the invention;

FIGS. 3A and 3B depict rescheduling a calendar in accordance with aspects of the invention;

DETAILED DESCRIPTION

Figure 1:
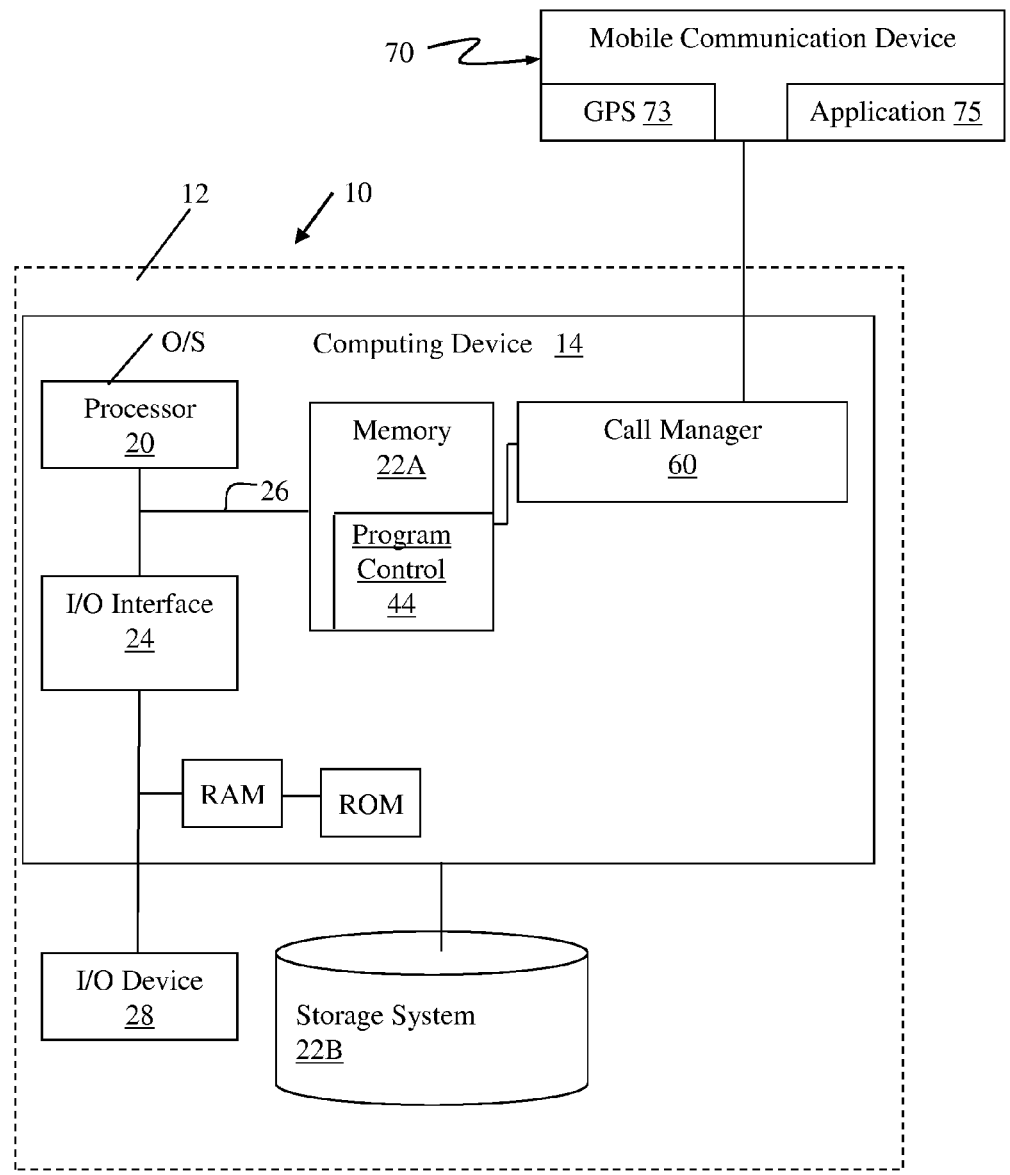
FIG. 1 shows an illustrative environment for implementing the steps in accordance with aspects of the invention.

The present invention generally relates to mobile call management, and more particularly, to methods and systems for managing calling times and locations to gain an economic advantage in calling rates. The systems and methods in embodiments may integrate call management with a global positioning system and a user calendar to manage calling rates of a mobile device. In accordance with aspects of the invention, the location, destination, and route of a user are employed in prospectively determining mobile call rates for the user at upcoming times and/or locations along the route to manage call usage. For example, in embodiments, the user can be informed of the most economical locations to make mobile calls along a travel route, as well as an estimated time the user will be present at those locations. In further embodiments, the determined call rates can be used to alert the user to an upcoming rate-transition boundary, such that the user can decide to initiate or terminate a mobile call before or after the rate-transition boundary. In this way, the caller can utilize a more favorable call rate when using the mobile device. In additional embodiments, the determined call rates can be compared to a scheduled call defined in a user calendar, and the call is automatically rescheduled in the calendar (or the user is prompted to reschedule the call) to coincide, in time, with a more favorable determined call rate. In even further embodiments, the determined call rates are used to inform the user of one or more available call rates within a predefined distance from a current location of the user. In yet further embodiments, the methods and systems keep track of savings provided by the determined call rates and provide a consolidated report.

Mobile call rates and charges are typically lower when a user is in their home zone and higher when not in their home zone. Further, rates of mobile calls may change drastically when a user moves from one geographic region to another, e.g., between different nations. Accordingly, call rates may vary when a user is travelling and, as a result, are frequently changing the cells or MSC across nations, which may result in the user being charged more for calls from some locations and charged less for calls from other locations.

For example, a user of a mobile communication device (e.g., cellular telephone, smartphone, softphone, etc.) may frequently travel in geographic regions where numerous international boundaries change within a few miles. There is a high variation of call rates in different countries which are along the user's route of travel and, due to high competition with mobile service providers, call charges are different at different locations. The user may find from experience that some particular locations are useful for conducting mobile calls during travel. However, a user's past experience does not and cannot take into account the dynamic (e.g., changing) information regarding new or changed service providers in locations and/or new or changed call rates offered by service providers.

In accordance with aspects of the invention, based on the methods and systems prospectively determining mobile call rates for the user at upcoming times and/or locations along a travel route, a user can reduce their mobile call charges by calling from one or more particular locations (e.g., lower rate locations) and avoiding calling from one or more other particular locations (e.g., higher rate locations). Accordingly, in some implementations of the invention, methods and systems determine the user's traveling route (e.g., via a Global Positioning System (GPS), navigation system, etc.), calculates different calling rates along the route, and alerts the user to optimal locations along the route where mobile calling is most economical.

In embodiments, the methods and systems alert the traveling user and/or influence the user's electronic calendar such that the user can make calls at the locations where the user will be charged the minimum call rates. The methods and systems may also update the user's schedule (e.g., reschedule a call on the user's calendar from one time to a different time) based on the determined call rates along the route in order to reduce the effective mobile call charges. Implementations of aspects of the invention may include a subscription plan by a service provider to allow an opt-in option for mobile customers. For example, a subscription plan option offered by a mobile service provider would provide updates to the mobile user of this plan based on the user's location (e.g., travel time/schedule determined by the GPS and speed of the mobile device, or, e.g., triangulation methodologies) and modify the user's calendar schedule appropriately. The updates may include details from which location the user can make calls which are more cost effective.

In accordance with aspects of the invention, the methods and systems access the user's source and destination locations and determine, on the basis of the current call rates along the user's path of travel, which location would be best suited for the user to make a call at the lowest call rates. Based on this determination, the methods and systems then alert the user when the user approaches and/or reaches such locations (e.g., which can be determined using GPS devices). Based on this analysis of the preferable location and integration with the user's calendar, the methods and systems can automatically reschedule a meeting (e.g., a scheduled call) by determining the time when the user would reach the preferred location using the speed of travel. Alternatively to automatically rescheduling the meeting, the methods and systems can make a suggestion to the user to reschedule the meeting, await user input, and reschedule the meeting after user confirmation.

In further embodiments, when the user is approaching a determined call rate transition boundary, the methods and systems calculate the difference in calling rates on both sides of the call rate transition boundary and notifies the user of the different calls rates. This permits the user to decide to initiate a call prior to or after the call rate transition boundary in order to take advantage of the lower of the rates. In even further embodiments, the methods and systems keep track of savings such that a consolidated report of saving may be presented to the user.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computer infrastructure 12 that can perform the processes described herein. In particular, the computer infrastructure 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S). The memory (e.g., 22A) may store business intelligence, data mining, regression analysis and/or modeling and simulation tools for execution by the processor 20.

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a call manager 60 that performs, e.g., the processes described herein. The call manager 60 can be implemented as one or more program code in the program control 44 stored in memory 22A as separate or combined modules. Additionally, the call manager 60 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in the computing device 14.

In accordance with aspects of the invention, the call manager 60 is configured to perform one or more of the processes described herein including, but not limited to: prospectively determine mobile call rates for a user at upcoming times and/or locations along a travel route of the user; alert the user to upcoming rate-transition boundaries; compare determined call rates to the user's calendar and automatically, or with user permission, change an already-scheduled call in the calendar to another time to coincide with a more favorable determined call rate; inform the user of one or more available call rates within a predefined distance from a current location of the user; and keep track of savings provided by the determined call rates and provides a consolidated report.

In embodiments, the call manager 60 is comprised in a computing device 14 that communicates with a user's mobile communication device 70. The mobile communication device 70 may comprise a cellular telephone, smartphone, softphone, or any other suitable wireless telecommunication device. As depicted in FIG. 1, the computing device 14 and call manager 60 may be separate from the mobile communication device 70. For example, the call manager 60 may reside on a computing device 14 that is at least one of created, provided, maintained, operated, deployed, and supported by a service provider, such as a mobile communication service provider with which the user has a subscription. In this manner, the call manager 60 may receive data from the mobile communication device 70 (e.g., user identification, GPS data, etc.) and access other data that is available to the service provider (e.g., user subscription data, call rates of other service providers, etc.) for the purpose of performing one or more of the processes described herein.

The invention is not limited to the call manager 60 being separate from the user's mobile communication device 70. For example, in embodiments, the call manager 60 may be comprised partly or wholly in the mobile communication device 70, e.g., as a software application stored and executable on the mobile communication device 70. In a particular embodiment, the call manager 60 resides on the computing device 14 and the mobile communication device 70 comprises a GPS component 73 and software application 75, such as a client program, application, etc., that is designed and configured to communicate with the call manager 60 to perform one or more of the processes described herein. The application 75 may further be configured to provide a user interface at the mobile communication device 70, including one or more displays, menus, etc., associated with the processes described herein.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the processes described herein, one or more computing devices on the computer infrastructure 12 can communicate with one or more other computing devices external to the computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

FIG. 2 shows a diagrammatic map of a travel route 100 of a user from a first location 105 to a second location 110. The travel route 100 may represent any type of planned movement of the user from the first location 105 to the second location 110, such as driving, riding a train, walking, flying, bicycling, boating, etc. In embodiments, the user traveling the route 100 possesses a mobile communication device 70 that includes or communicates with a GPS component or can be tracked via triangulation. The route 100 may be defined, e.g. stored, as data in the GPS component in a normal fashion. For example, the user may input or otherwise define the first location 105 and the second location 110, and any other desired waypoints, to the GPS component and permit a mapping or navigation function of the GPS component to plot the route 100. Other methods of defining the route 100 are usable within the scope of the invention.

In accordance with aspects of the invention, the mobile communication device 70 communicates the route 100 to the call manager 60. For example, the mobile communication device 70 may transmit data defining the route 100 to the computing device 14 comprising the call manager 60 in any suitable manner, such as by cellular, Wi-Fi, WiMAX, or any other wireless transmission technique. The data defining the route 100 may include the first location 105, e.g., first longitude and latitude, and the second location 110, e.g., second longitude and latitude. In embodiments, the mobile communication device 70 also communicates the current location 115, e.g., current longitude and latitude, of the user to the computing device 14, the user location 115 being determined using the GPS component in a known manner. The mobile communication device 70 may also communicate user identification data to the computing device 14.

According to aspects of the invention, upon receiving data defining the route 100, user location 115, and user identification from the mobile communication device 70, the call manager 60 determines mobile call rates for the user along the route 100. In embodiments, this can be accomplished by determining mobile service providers that provide call coverage along the route 100 and comparing the user's mobile calling subscription to the available service providers.

For example, the call manager 60 uses data defining the route 100 to identify service providers that provide mobile calling coverage along the route 100. This may be performed in any suitable manner, such as the call manager 60 accessing coverage maps of service providers and comparing the coverage maps to the route 100. In embodiments, the call manager 60 may also access rate tables, rate maps, and/or any other available rate information, such as specials, discounts, etc., for the identified service providers along the route 100, and determine the rates each respective service provider charges for a call at locations along the route 100. Coverage maps, rate tables/maps, and other rate information are available from the respective service providers and can be accessed by the call manager 60, in real time, by the call manager 60 communicating with computing systems of the various service providers. Additionally or alternatively, the call manager 60 may periodically obtain coverage maps, rate tables/maps, and or other coverage and rate information from service providers and store this data, e.g., in storage system 22B, for faster access to coverage and rate data when a user is utilizing the call manager 60 as described herein.

Since call rates typically depend on a user's subscription, the call manager 60 employs the user identification to look up the user's mobile communication subscription information, such as service provider, plan, data and/or voice allowances, rates, etc. The user's mobile communication subscription information may be stored as data in a storage system, e.g., storage system 22B, which may be integrated with or otherwise accessible by the call manager 60. By comparing the data defining the route 100, the user's subscription information, and the coverage maps and rate maps/tables, the call manager 60 determines how much it will cost for the user to make a mobile call with the mobile communication device 70 at locations along the route 100. The call manager 60 then determines the lowest available call rates from the determined call rates, and communicates these lowest call rates and corresponding locations to the mobile communication device 70 for display to the user.

In the example shown in FIG. 2, the call manager 60 has identified zones 120a, 120b, . . . , 120n having the lowest available mobile call rates for the user along the route 100. In embodiments, the zones 120a . . . n are graphically displayed on a map of the route 100, for example using a GPS mapping or navigation display of the mobile communication device 70. In this regard, FIG. 2 may represent a display that is presented to the user, e.g., on the mobile communication device 70. The zones 120a . . . n may represent, for example, areas displayed on a GPS or navigation map where the user receives a relatively lower mobile call rate as determined by the call manager 60. The zones 120a . . . n may be indicated to the user in other manners, such as by text display and/or audio output of the mobile communication device 70. In this manner, the call manager 60 informs the user of the optimal (e.g., lowest) call rate locations along the route 100 so that the user may make an informed decision as to when it would be most economic to make a mobile call. A predetermined number of zones to display on the map may be defined by the user in user-defined policies (e.g., an account setup or options step).

In additional embodiments of the invention, the call manager 60 determines an estimated time the user will arrive at (e.g., be present at) each zone 120a . . . n. For example, the call manager 60 may determine the estimated times based on: the current location of the user (e.g., latitude and longitude), the actual or estimated travel speed of the user (e.g., determined from the GPS component or estimated from navigation/mapping software), and the latitude and longitude of each zone 120a . . . n. The call manager 60 may communicate the estimated times to the mobile communication device 70 such that the estimated times 125a . . . n may be displayed to the user in association with the zones 120a . . . n.

In accordance with further aspects of the invention, the call manager 60 alerts the user when the user is approaching a rate transition boundary. In FIG. 2, the location 115' represents a user location as the user is approaching first zone 120a, location 115" represents another user location as the user is about to exit first zone 120a, and location 115'" represents another user location after the user has exited the first zone 120a. The determined mobile call rate for the user at location 115' is higher than the determined mobile call rate for the user inside zone 120a, such that a rate transition boundary 150 exists between location 115' and zone 120a. Also, the determined mobile call rate for the user at location 115" inside the first zone 120a is lower than the determined mobile call rate for the user at location 115'" outside the first zone 120a, such that a rate transition boundary 150' exists between location 115" and location 115'".

In embodiments, the call manager 60 determines when the user is a predetermined distance and/or predetermined estimated travel time from a boundary 150 or 150' and transmits data to the mobile communication device 70 for alerting the user of the upcoming boundary 150 or 150'. For example, using the user's current location (e.g., from GPS), current actual or estimated speed (e.g., from GPS), and the longitude and latitude of the boundary 150 or 150' (e.g., defined by the route 100 and the zones 120a . . . n), the call manager 60 determines when the user is approaching a boundary 150 or 150' and transmits data to the mobile communication device 70 to the alert the user of the upcoming rate transition boundary 150 or 150'. In this manner, the user can decide to initiate and/or terminate a mobile call before or after the upcoming boundary to achieve a more favorable call rate. The predetermined distance and/or predetermined estimated travel time may be defined by the user in user-defined policies (e.g., an account setup or options step).

According to further aspects of the invention, the call manager 60 compares determined mobile call rates along the route 100 to an electronically stored user calendar and automatically, or with user permission, changes an already-scheduled call in the calendar to coincide with a more favorable call rate, e.g., zones 120a . . . n and/or estimated times 125a . . . n. For example, referring to FIG. 3A, the user associated with the mobile communication device 70 may have a calendar 130 stored on the mobile communication device 70 or stored at some other storage location, and the calendar 130 may define a scheduled call 135 for the user at a predetermined time 140, e.g., 12:20 PM. In embodiments, data defining the calendar 130 is transmitted to the call manager 60 from the mobile communication device 70, or the call manager 60 accesses the calendar data from another location with the permission of the mobile communication device 70. By comparing the calendar data to the determined estimated times 125a . . . n coinciding with the lowest rate zones 120a . . . n, the call manager 60 may automatically (or with user permission) re-schedule the call 135 to a new time 145, e.g., 12:30, as shown in FIG. 3B. The call manager 60 determines the new time 145 to coincide with one of the estimated times 125a . . . n coinciding with the lowest rate zones 120a . . . n, as depicted by comparison of FIGS. 2 and 3B.

In embodiments, the user may define their user-defined policies (e.g., account options) to permit automatic calendar rescheduling by the call manager 60. In additional embodiments, the user may define their account options to cause the call manager 60 to prompt the user and obtain user permission before performing calendar rescheduling. For example, upon determining that a scheduled call 135 may be moved to a new time 145, the call manager 60 may send a notification to the mobile communication device 70. Upon receipt of the notification, the mobile communication device 70 displays a message to the user. For example, the message shows the originally scheduled time 140 and the suggested new time 145, and also asks the user for permission to change the calendar to adopt the suggested new time 145. The user may accept or decline the suggested new time using any suitable input to the mobile communication device 70, e.g., touchscreen, keypad, voice command, etc. When the user accepts the suggested new time 145, the data defining the calendar 130 is changed to reflect the new time.

Figure 4:
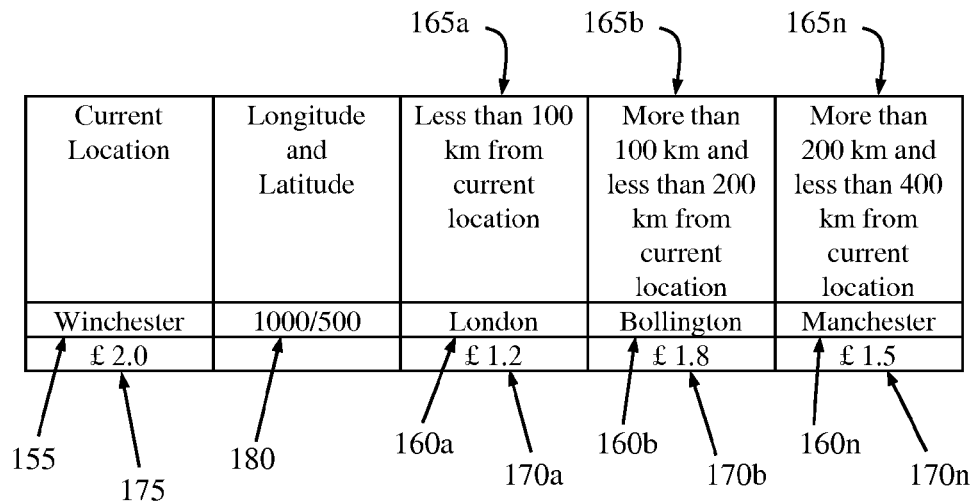
FIGS. 4 and 5 show exemplary notifications in accordance with aspects of the invention.

FIG. 4 shows an additional tabular format for displaying rate information to the user of the mobile communication device 70 in accordance with aspects of the present invention. For the display shown in FIG. 4, the call manager 60 determines call rates at locations along the route of the user as described above with respect to FIG. 2, e.g., by comparing data defining the route, user subscription information, and coverage maps and rate maps/tables of available service providers along the route. The display in FIG. 4 comprises a table showing the user current location 155 and other locations 160a, 160b, . . . , 160n having low mobile call rates for the user. In embodiments, the other call locations 160a . . . n are determined in the same manner as the zones 120a . . . n. However, in the display shown in FIG. 4, the locations are displayed in textual form as the name of a town, city, locality, or other identifying name. Additionally, a distance 165a, 165b, . . . , 165n from the user current location 400 to each of the other locations 160a . . . n may be displayed with each respective other location. Additionally, a corresponding rate 170a, 170b, . . . , 170n may be displayed with each of the respective locations 160a . . . n. In this manner, the user may compare the current rate 175 at the current location 155 to the rates 170a . . . n at other locations 160a . . . n along the route. Optionally, the display may also comprise the longitude and latitude 180 corresponding to the user current location 155.

In embodiments, the call manager 60 determines the locations 160a . . . n, distances 165a . . . n, and rates 170a . . . n using the information as described above with respect to FIG. 2, e.g., user current location data (e.g., latitude and longitude), data defining the route, user subscription information, and coverage maps and rate maps/tables of available service providers along the route. Upon determining the locations 160a . . . n, distances 165a . . . n, and rates 170a . . . n, the call manager 60 transmits data to the mobile communication device 70 for displaying the locations 160a . . . n, distances 165a . . . n, and rates 170a . . . n in the tabular display shown in FIG. 4.

In embodiments, the combination of user current location data (e.g., latitude and longitude), data defining the route, user subscription information, and coverage maps and rate maps/tables of available service providers along the route is referred to as master data and is enhanced by the user's service provider as a continuous process. One example of continuously enhancing the master data is the call manager 60 updating the current location of the user by periodically polling the GPS component of the mobile communication device 70. Another example of continuously enhancing the master data is the call manager 60 periodically updating stored data defining the coverage maps, rate maps/tables, and/or other coverage/rate information of available service providers.

Figure 5:
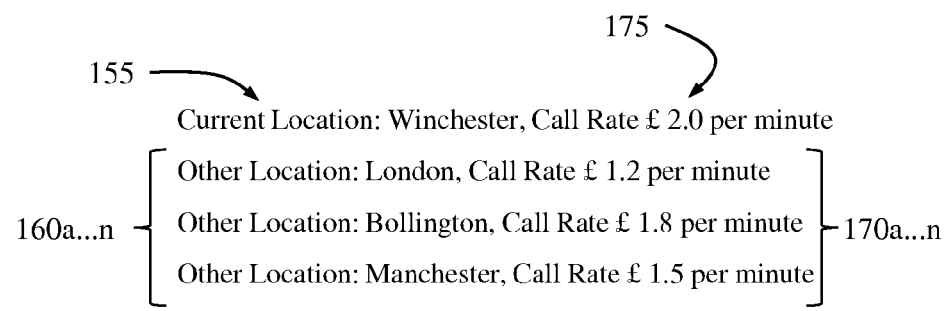

In further implementations, the determined locations 160a . . . n and rates 170a . . . n may be displayed in a plain text format. For example, as depicted in FIG. 5, the current location 155 and current call rate 175 may be displayed in a first line of text, and the respective locations 160a . . . n and corresponding rates 170a . . . n may be displayed in respective rows of text on a display of the mobile communication device 70.

Flow Diagrams

Figure 6:
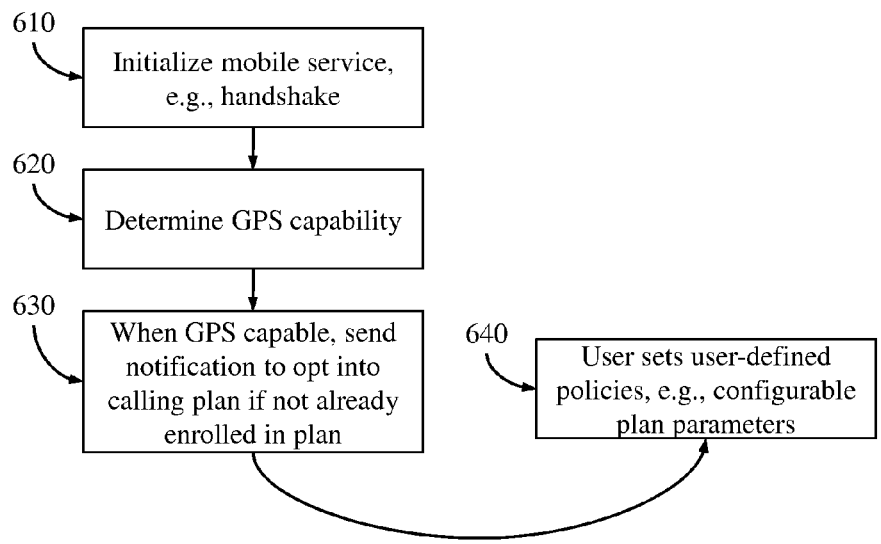
FIGS. 6 and 7 show exemplary flows in accordance with aspects of the invention.
Figure 7:
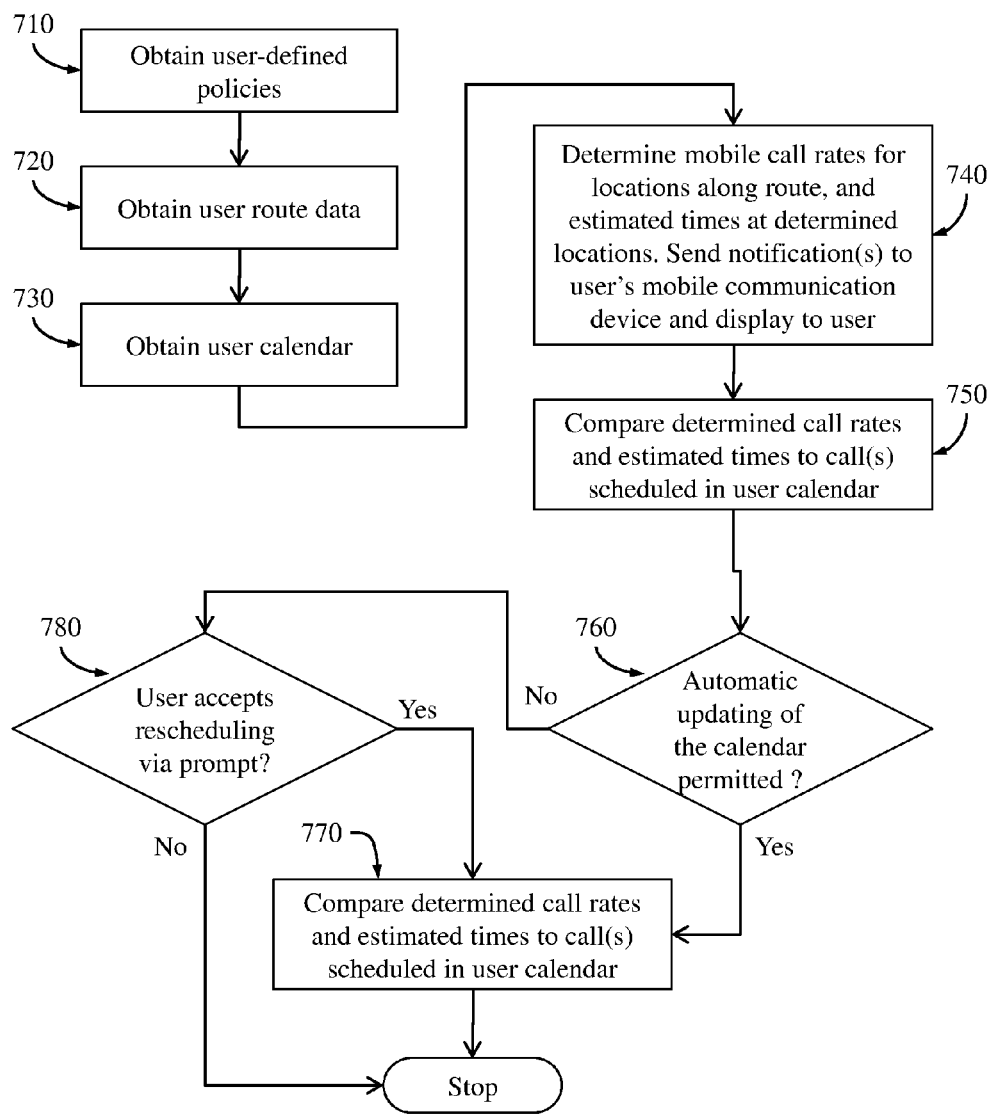

FIGS. 6 and 7 show exemplary flows for performing aspects of the present invention. The steps of FIGS. 6 and 7 may be implemented in the environment of FIG. 1, for example.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 6 depicts an exemplary flow for a process of initializing mobile service and defining user policies associated with a mobile calling plan that implements aspects of the invention as described above with respect to FIGS. 2-5. At step 610, the user initializes mobile service. In embodiments, this comprises the user turning on their mobile communication device (such as mobile communication device 70 described above). When the mobile communication device is turned on, a handshake between the mobile communication device and mobile service provider network is performed as described in greater detail below with respect to FIG. 8. The handshake may comprise, for example, sending user/device identification information, device capability, and/or changed settings of the mobile communication device to the service provider.

At step 620, the service provider (e.g., using call manager 60) determines whether the mobile communication device from step 610 has GPS capability. Upon determining the mobile communication device has GPS capability, at step 630, the service provider messaging system sends a notification to the mobile communication device to enable a mobile calling plan that implements aspects of the invention. In embodiments, this occurs when the plan is not already integrated with an existing plan per registered data of the mobile number of the mobile communication device. For example, when the service provider determines a GPS enabled mobile communication device does not yet subscribe to the mobile calling plan, the service provider sends a message to the mobile communication device offering the user the option to subscribe to the mobile calling plan, e.g., opt into the plan.

At step 640, a user who subscribes to the mobile calling plan sets their user-defined policies. The user-defined policies may include any desired plan configuration parameters, such as: how often to send determined call rates (e.g., rates 170a . . . n) and corresponding locations (e.g., locations 160a . . . n) to the mobile communication device; preference for how to be notified of determined rates (e.g., map-based as in FIG. 2, tabular as in FIG. 4, text-based as in FIG. 5); minimum and/or maximum number of zones (e.g., zones 120a . . . n) to display along a route; permitting calendar rescheduling automatically, after call manager suggestion and subsequent user permission, or not at all; predetermined distances and/or predetermined estimated travel times from a boundary (e.g., as described above with respect to FIG. 2), etc. In embodiments, the user inputs their user-defined policies via an interface displayed at the mobile communication device (e.g., graphical menu) which can be transmitted to the service provider for association and storage with the user subscription data.

FIG. 7 depicts an exemplary flow for a process that implements aspects of the invention as described above with respect to FIGS. 2-5. At step 710, the call manager (e.g., call manager 60) obtains the user-defined policies. In embodiments, when the mobile communication device handshakes with the mobile service provider network, the call manager receives a user identity such as a mobile telephone or device identification number from the mobile communication device. In embodiments, the call manager can retrieve user subscription information, including the user defined polices, by accessing stored data associated with the user identity. The user-defined policies may comprise the configurable parameters described above with respect to step 640.

At step 720, the call manager obtains or receives the route data of the user. In embodiments, the route data corresponds to route 100 and may include data defining an origination location (e.g., first location 105), a destination location (e.g., second location 110), and a path of travel between the origination and destination locations. In implementations, the user defines/inputs the route data using the GPS component of the mobile communication device, and the mobile communication device transmits the route data to the call manager.

At step 730, the call manager obtains or receives data defining calls the user has scheduled during travel along the route. In embodiments, the mobile communication device sends the user electronic calendar to the call manager. In other embodiments in which the user calendar is stored at a location other than the mobile communication device, the mobile communication device instructs the call manager to access the user calendar.

At step 740, the call manager determines call rates for locations along the route. This may be performed as described above with respect to FIG. 2. For example, the call manager may use master data, e.g., user current location data (e.g., latitude and longitude), data defining the route, user subscription information, and coverage maps and rate maps/tables of available service providers along the route, to determine mobile call rates for the user at locations along the route. Step 740 may also include the call manager determining estimated times (e.g., times 125a . . . n) at which the user will be present at the determined lower-rate locations, e.g., in the manner described above with respect to FIG. 2. Step 740 may further include the call manager transmitting data to the mobile communication device to notify the user of at least one of: determined zones for overlaying a GPS map as described with respect to FIG. 2; approaching a rate transition boundary as described with respect to FIG. 2; and determined locations and rates as described with respect to FIGS. 4 and 5.

At step 750, the call manager compares the estimated times to scheduled calls in the user calendar. At step 760, the call manager determines whether the user-defined policies permit automatic updating of the calendar. When automatic updating of the calendar is permitted, at step 770, the call manager automatically changes the user calendar to reschedule an already scheduled call to coincide with an estimated time when the user will be at a lower-rate location based on the comparison at step 750. Step 770 also comprises the call manager sending a notification to the mobile communication device when the user arrives at the lower-rate location to alert the user to make or receive the rescheduled call.

When automatic updating of the calendar is not permitted, then, at step 780, the call manager sends a prompt to the mobile communication device for suggesting to the user to reschedule the call to coincide with the estimated time when the user will be at a lower-rate location. If the user accepts the rescheduling via the prompt, then the process proceeds to step 770, where the call is rescheduled as already described herein. The user may also decline the rescheduling at step 780, at which point the process ends.

Figure 8:
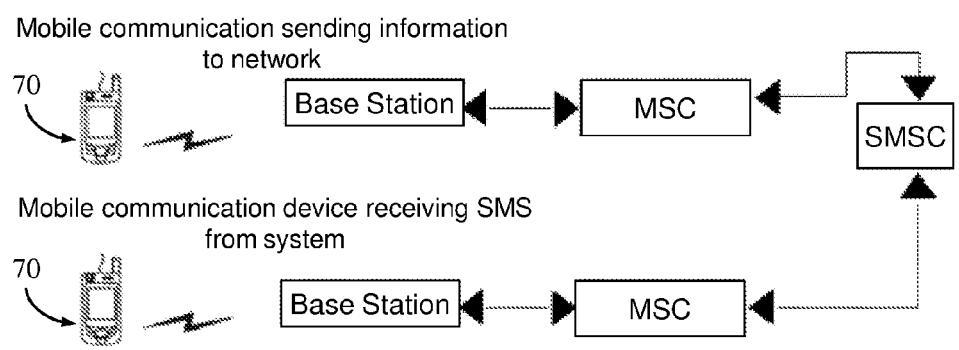
FIG. 8 shows a block diagram of a handshaking arrangement.

FIG. 8 depicts a handshaking routine which may be implemented in step 610, as described with respect to FIG. 6. In the handshaking routine, the mobile communication device 70 sends identifying information to the network when the mobile communication device 70 is turned on. The identifying information may comprise, for example, a device identifier and/or a mobile number. The identifying information may be sent in any suitable manner, e.g., short messaging service (SMS), and may be transmitted to a base station (BS), mobile switching center MSC, and short messaging service center (SMSC). In return, the SMSC generates and sends a second SMS message back to the mobile communication device 70 via the MSC and BS.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure, comprising:
   determining a current location of a mobile communication device;

determining a route of a user associated with the mobile communication device;
determining mobile call rates for the user at locations along the route;
providing information regarding the mobile call rates to the user;
storing cost saving information associated with the mobile call rates; and
generating a report based on the stored cost savings information,
wherein the information regarding the mobile call rates includes:
an option to the user to subscribe to a mobile calling plan; and
predefined distance information associated with one or more of the mobile call rates based on a current location of the user.

2. The method of claim 1, wherein the route comprises a first location, a second location, and travel path between the first and second locations.

3. The method of claim 1, wherein the determining the route comprises obtaining or receiving data defining the route from the mobile communication device.

4. The method of claim 1, wherein the determining the mobile call rates comprises accessing at least one of coverage maps, rate maps, and rate tables of one or more mobile communications service providers.

5. The method of claim 4, wherein the determining the mobile call rates comprises comparing the at least one of coverage maps, rate maps, and rate tables to the route.

6. The method of claim 1, further comprising determining at least one zone along the route having a lower call rate than other locations along the route.

7. The method of claim 6, further comprising transmitting data defining the at least one zone to the mobile communication device for display on a map of the route.

8. The method of claim 6, further comprising:
determining an estimated time the user will arrive at the at least one zone; and
transmitting data defining the at least one zone and the estimated time to the mobile communication device for display on the map of the route.

9. The method of claim 6, wherein the at least one zone comprises a plurality of zones, and further comprising:
determining estimated times the user will arrive at respective ones of the plurality of zones; and
transmitting data defining the plurality of zones and the estimated times to the mobile communication device for display on the map of the route.

10. The method of claim 6, further comprising transmitting data defining the at least one zone and the lower call rate to the mobile communication device for display as one of a table and lines of text.

11. The method of claim 1, further comprising determining the user is approaching a rate transition boundary along the route.

12. The method of claim 11, further comprising transmitting data to the mobile communication device to alert the user that the user is approaching the rate transition boundary.

13. The method of claim 11, wherein the determining the user is approaching the rate transition boundary is based on a current location of the user, an actual or estimated speed of the user, and one of a predetermined distance and a predetermined estimated travel time to the rate transition boundary.

14. The method of claim 1, further comprising comparing the determined mobile call rates to a calendar associated with the user.

15. The method of claim 14, further comprising changing the calendar by rescheduling a call defined in the calendar to coincide with an estimated time the user will arrive at a location along the route having a lower call rate than other locations along the route.

16. The method of claim 15, wherein the rescheduling is performed automatically without input from the user.

17. The method of claim 15, further comprising suggesting the rescheduling to the user, receiving authorization for the rescheduling from the user, and performing the rescheduling after the receiving authorization.

18. The method of claim 1, wherein a service provider at least one of creates, maintains, deploys and supports the computer infrastructure.

19. The method of claim 1, wherein steps of claim 1 are provided by the service provider on a subscription, advertising, and/or fee basis.

20. A system implemented in hardware, comprising:
a processor executing a call manager that operates to:
determine master data associated with a user and a mobile communication device;
determine mobile call rates for the user at locations along a route based on the master data;
provide information regarding the mobile call rates to the user;
store cost saving information associated with the mobile call rates; and
generate a report based on the stored cost savings information,
wherein the information regarding the mobile call rates includes:
an option to the user to subscribe to a mobile calling plan; and
predefined distance information associated with one or more of the mobile call rates based on a current location of the user.

21. The system of claim 20, wherein the master data comprises: user current location data, data defining the route, user subscription information, and at least one of coverage maps, rate maps and rate tables of available service providers along the route.

22. A computer program product comprising a non-transitory computer usable storage medium having readable program code embodied in the storage device, the computer program product includes at least one component that when executed by a processor causes the processor to perform the steps of:
obtain master data associated with a user and a mobile communication device;
determine mobile call rates for the user at locations along a route based on the master data;
transmit data to the mobile communication device notifying the user of at least one of the determined mobile call rates;
provide information regarding the mobile call rates to the user;
store cost savings information associated with the mobile call rates; and
generate a report based on the stored costs savings information,
wherein the information regarding the mobile call rates includes:
an option to the user to subscribe to a mobile calling plan; and
predefined distance information associated with one or more of the mobile call rates based on a current location of the user.

23. The computer program product 22, wherein the at least one component is operable to:
  compare the determined mobile call rates to a calendar associated with the user; and
  change the calendar by rescheduling a call defined in the calendar to coincide with an estimated time the user will arrive at a location along the route having a lower call rate than other locations along the route.

24. A computer system for call management integrated with global positioning and a user calendar, the system comprising:
  a CPU, a computer readable memory and a computer readable storage media;
  first program instructions to obtain master data associated with a user and a mobile communication device;
  second program instructions to determine mobile call rates for the user at locations along a route based on the master data;
  third program instructions to provide information regarding the mobile call rates;
  fourth program instructions to transmit data to the mobile communication device notifying the user of at least one of the determined mobile call rates;
  fifth program instructions to compare the determined mobile call rates to a calendar associated with the user;
  sixth program instructions to change the calendar by rescheduling a call defined in the calendar to coincide with an estimated time the user will arrive at a location along the route having a lower call rate than other locations along the route;
  seventh program instructions to store cost saving information associated with the mobile call rates; and
  eighth program instructions to generate a report based on the stored costs savings information,
  wherein the first, second, third, fourth, fifth, sixth, and seventh program instructions are stored on the computer readable storage media for execution by the CPU via the computer readable memory;
  the master data comprises: user current location data, data defining the route, user subscription information, and at least one of coverage maps, rate maps and rate tables of available service providers along the route; and the information regarding the mobile call rates includes:
    an option to the user to subscribe to a mobile calling plan; and
    predefined distance information associated with one or more of the mobile call rates based on a current location of the user.

25. A method of deploying a system for call management integrated with global positioning and a user calendar, comprising:
  providing a computer infrastructure operable to:
    obtain master data associated with a user and a mobile communication device;
    determine mobile call rates for the user at locations along a route based on the master data;
    provide information regarding the mobile call rates to the user;
    transmit data to the mobile communication device notifying the user of at least one of the determined mobile call rates;
    compare the determined mobile call rates to a calendar associated with the user; and
    change the calendar by rescheduling a call defined in the calendar to coincide with an estimated time the user will arrive at a location along the route having a lower call rate than other locations along the route;
    store cost saving information associated with the mobile call rates; and
    generate a report based on the stored costs savings information,
    wherein the master data comprises: user current location data, data defining the route, user subscription information, and at least one of coverage maps, rate maps and rate tables of available service providers along the route, and
    wherein the information regarding the mobile call rates includes:
      an option to the user to subscribe to a mobile calling plan; and
      predefined distance information associated with one or more of the mobile call rates based on a current location of the user.

\* \* \* \* \*